(12) United States Patent
Lobban et al.

(10) Patent No.: US 7,865,550 B2
(45) Date of Patent: Jan. 4, 2011

(54) MESSAGE PROCESSING CONTROL IN A PUBLISH/SUBSCRIBE SYSTEM

(75) Inventors: Trevor Lobban, Eastleigh (GB); David Postelthwaite, Horton Heath (GB); Tristram Terence Reilly, Eastleigh (GB); Jonathan Woodford, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/354,906

(22) Filed: Jan. 16, 2009

(65) Prior Publication Data

US 2009/0187635 A1 Jul. 23, 2009

(30) Foreign Application Priority Data

Jan. 21, 2008 (EP) .................................. 08150434

(51) Int. Cl.
*G06F 15/16* (2006.01)
(52) U.S. Cl. ........................ 709/203; 709/220; 709/227; 370/241; 370/315
(58) Field of Classification Search .................. 709/203, 709/220, 224, 228; 370/241, 338
See application file for complete search history.

(56) References Cited

U.S. PATENT DOCUMENTS 7,742,425 B2* 6/2010 El-Damhougy ............. 370/241
2007/0061423 A1* 3/2007 Accapadi et al. ............ 709/219
2007/0299947 A1* 12/2007 El-Damhougy ............. 709/223
2008/0028069 A1* 1/2008 Urbanek et al. ............. 709/224

* cited by examiner

*Primary Examiner*—Khanh Q Dinh

(57) ABSTRACT

Messages in a publish/subscribe system can be processed after they leave the original publisher and before they are delivered to an ultimate subscriber. Each published message has an associated topic string and a PubLevel value initially assigned by the original publisher. Subscribers are assigned different SubLevel values. These subscribers register their subscriptions with a broker. When a published message having the appropriate topic string is received, the broker performs a subscriber selection process using the message topic string, the current message PubLevel value and the assigned SubLevel values of subscribers registered for the topic string. When a subscriber is selected, the broker changes the message PubLevel value and transmits the message only to the selected subscriber. The subscriber may be an intercepting subscriber that processes the published message and then re-publishes it back to the broker. The broker may repeat the subscriber selection process multiple times with the published message being sent to multiple intercepting systems, each of which processes and republishes the message before the processed message is finally sent by the broker to an ultimate subscriber.

12 Claims, 4 Drawing Sheets

MESSAGE PROCESSING CONTROL IN A PUBLISH/SUBSCRIBE SYSTEM

BACKGROUND

The preferred embodiment relates to Publish/Subscribe (pub/sub) systems and more particularly to the controlled processing of published messages in such systems.

A Publish and Subscribe (pub/sub) system is an effective way of disseminating information to multiple users. Pub/Sub applications can help to simplify the task of getting business messages and transactions to a wide-spread, dynamically changing and potentially large audience in a timely manner.

In a pub/sub system, publishers are not concerned with where their messages go and subscribers are not interested in where the messages they receive have come from. Instead, a broker typically assures the integrity of the message source and manages the distribution of a message according to subscriptions registered in the broker.

Ordinarily, a published message is delivered to subscribers in the same form it had when originally published. There is a need for flexibility such that a message can be modified after its original publication and before delivery to a final subscriber.

SUMMARY

The present invention may be implemented as a broker apparatus used in a publish/subscribe system in which a published message originating with a publisher is identified by an associated topic string and originally includes an associated PubLevel value assigned by the publisher. Upon receipt of the published message in a receive component, a subscriber selection component in the broker apparatus selects a subscriber from a set of subscribers that have registered subscriptions with the broker to receive messages identified by the topic string. Each subscriber in the set will have an assigned SubLevel value. The broker includes a publication control component that changes the PubLevel value of the message and a transmit component to transmits it to the selected subscriber.

The present invention may also be implemented as a method performed in a broker apparatus in a publish/subscribe system in which a published message originating with a publisher is identified by an associated topic string and originally includes an associated PubLevel value assigned by the publisher. The published message is received at the broker. The broker identifies the message topic string and PubLevel value and selects a subscriber to receive the message from a set of subscribers who have already subscribed to receive messages identified by the topic string. Once the subscriber is selected, the broker changes the message PubLevel value as a function of the SubLevel value of the selected subscriber and transmits the message only to the selected subscriber.

Finally, the present invention may be implemented as a computer program product including a computer usable medium embodying computer usable program code configured to receive a published message having an associated topic string and a PubLevel value originally assigned by the original publisher of the message, to select a subscriber from a set of subscribers who previously registered subscriptions to receive messages identified by the associated topic string, to change the message PubLevel value as a function of a SubLevel value assigned to the selected subscriber and to sent the message only to the selected subscriber.

DETAILED DESCRIPTION

Figure 1:
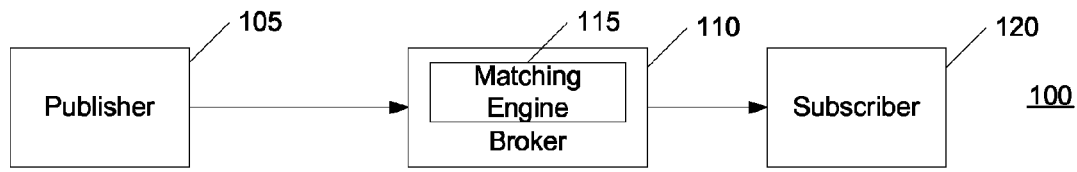
FIG. 1 is a block diagram of a prior art publish/subscribe system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The use of topic strings is key to distribution of messages between publishers and subscribers in a pub/sub system. FIG. 1 illustrates a basic pub/sub system 100. A publisher 105 generates messages and assigns a topic string to each message. The publisher 105 does not attempt to deliver the messages to individual users but instead delivers them to a message broker 110. The message broker 110 act as an intermediary between the publisher 105 and individual users, only one user 120 being illustrated. The message broker 110 accepts subscriptions from individual subscribers for future delivery of messages having particular assigned topic strings.

When a newly published message is received at the message broker 110, a matching engine 115 in the broker uses the topic string associated with the message to look up which subscribers, if any, have already registered subscriptions at the broker indicating they want to receive published messages identified by the same topic string. In a prior art system, the published message is forwarded directly to each subscriber having a current subscription on record at the broker.

In a prior art pub/sub system, the broker is basically a pass-through between the original publisher and the ultimate subscriber and the message reaches the ultimate subscriber in essentially the same form it left the original publisher.

Figure 2:
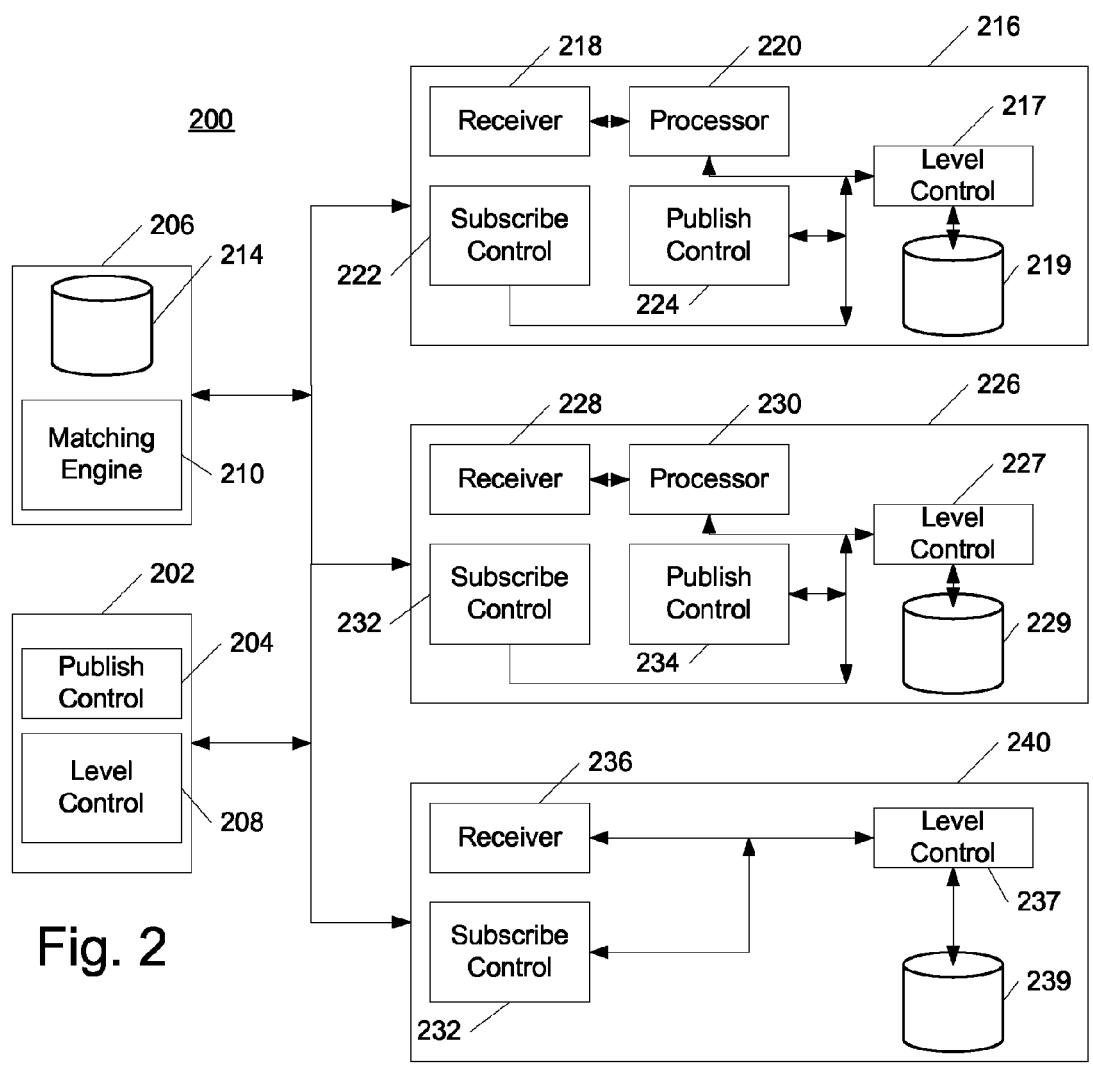
FIG. 2 is a block diagram of an embodiment of a publish/subscribe system implemented in accordance with the present invention.

FIG. 2 is a block diagram of a system 200 implementing one embodiment of the invention. The system 200 includes a publisher 202 having a publish control component 204 and a level control component 208. The basic function of the level control component 208 is to assign a publication level (PubLevel) value to each published message either in response to an initial user input or in accordance with one or more rules stored in a memory in the level control component and in a rules database 214. In the embodiment to be described, it is assumed the PubLevel value may be an integer in the range 0-9.

In systems implementing the present invention, a PubLevel value is associated with each publication (published message) while a subscriber level or SubLevel value is associated with each subscriber in the pub/sub system. A SubLevel value may also be an integer in the range of 0 to 9. The bases for assigning SubLevel values to different subscribers is discussed in more detail later.

The system 200 also includes a broker 206 having a matching engine 210 that analyzes a topic string associated with a received message to determine, among other things, whether one or more subscribers (referred to as candidate subscribers) have already registered subscriptions with the broker to receive messages identified by the analyzed topic string.

Additionally, the system 200 also includes one or more interceptor systems that are capable of performing transformations or other operations on published messages. Two separate interceptor systems 216 and 226 are shown in FIG. 2.

The first interceptor system 216 includes a receiver subsystem 218 for receiving published messages, a processor 220, a level control component 217 and a rules database 219. As will be explained in more detail later, an interceptor system operates both as a subscriber and a publisher and includes both a subscribe control component 222 and a publish control component 224.

The architecture of the second interceptor system 226 is equivalent to the architecture of interceptor system 216. Interceptor system 226 includes its own receiver 228, processor 230, level control component 227, rules database 229, subscribe control component 232 and publish control component 234.

For pub/sub systems to be useful, there must be ultimate subscribers. FIG. 2 shows a single subscriber system 240 with its own receiver 236, subscribe control circuit 232, level control circuit 237 and rules database 239. Obviously, in a typical pub/sub system, there will be many subscribers, not just one.

As noted earlier, an interceptor system operates as both a message subscriber and a message publisher. An interceptor system can intercept a published message, process the published message (e.g., by transforming it from one markup protocol to another) and then re-publish the message, as will be described in more detail below. Interceptor systems are intermediary systems which receive and process messages before those messages finally reach an ultimate subscriber, where the message may be stored without being made available for re-publication.

PubLevel values, assigned to published messages, and SubLevel values, assigned to candidate subscriber systems (such as interceptor systems or ultimate subscriber systems), control the path of a message through the pub/sub. Generally speaking, interceptor systems with higher SubLevel values are given higher priority in processing the message than interceptor systems with lower SubLevel values. The type of processing that is performed in an interceptor system (examples are encryption, protocol transformation, etc.) is initially programmed into the interceptor systems by a system designer or programmer to make certain that the appropriate transformations occur in the message in the appropriate order before the message reaches the ultimate subscriber.

In one embodiment, SubLevel values are assigned to potential message subscribers based on input from users or system administrators and do not change. One possible set of rules in assigning SubLevel value is set forth below.

Rule 1. A default SubLevel value of "1" is assigned to subscribers that will not re-publish received messages; e.g., end user applications.

Rule 2. An interceptor system is assigned a SubLevel value greater than "1".

Rule 3. If it is known that multiple interceptor systems will be used to process a published message, the interceptor systems will be assigned successively lower SubLevel va values to establish the order in which they will be employed.

Rule 4. If multiple interceptor systems will be used, each system will be assigned a different SubLevel value.

A different set of rules is employed to assign PubLevel values to messages both initially and during processing within the pub/sub system. The rules for assigning PubLevel values are discussed in more detail in the context of an example of how a particular message would be processed in the system shown in FIG. 2.

Figure 3:
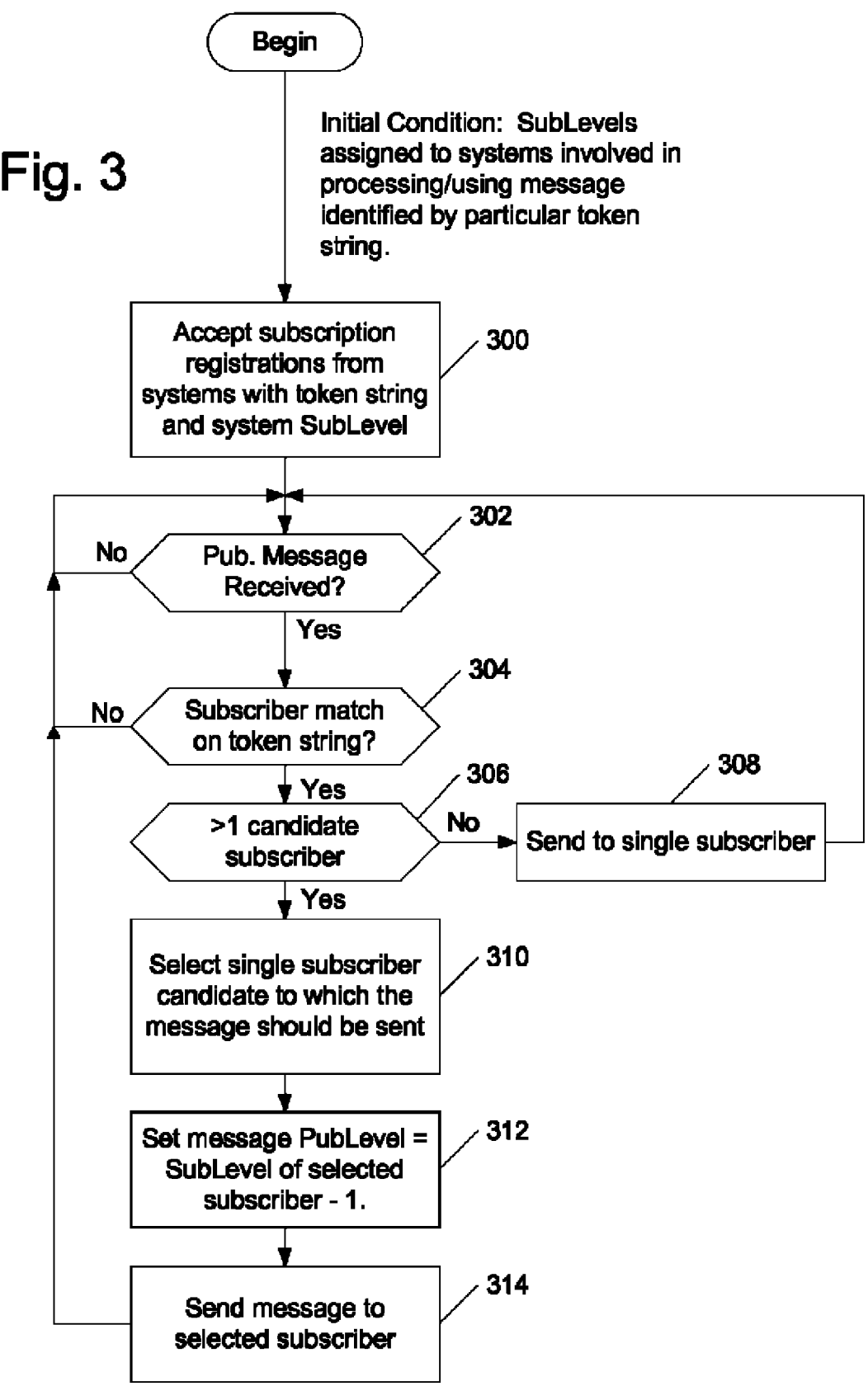
FIG. 3 is a flow chart of operations performed by a broker in a publish/subscribe system implementing the present invention.

FIG. 3 is a flow chart of operations that are performed by a broker system in a pub/sub system implementing the present invention. It is assumed that it has already been decided that each published message having a particular topic string should be processed in interceptor system 216 and then in interceptor system 226 before delivery to an ultimate or target subscriber 240.

Before any published messages identified by a particular topic string are generated, initial conditions are established for each of the systems intended to be involved in processing or receiving such messages. SubLevel values associated with the topic string are assigned to the systems by the level control modules within the systems either in accordance with information supplied directly by system administrators or indirectly through access to the rules databases already resident in the systems. The rules databases will support implementation of the previously discussed and other rules.

For purposes of illustration, it is assumed that a SubLevel=9 is assigned to interceptor system 216, a SubLevel=5 is assigned to interceptor system 226 and a SubLevel=1 is assigned to subscriber system 240.

Once appropriate sublevel values are assigned to systems 216, 226 and 240, each of those systems submits a subscription to the broker to receive published messages identified by the topic string. Each subscription includes both the topic string and the assigned SubLevel value of the subscribing system. The broker registers the subscriptions (operation 300) and initiates a watch for published messages identified by the topic string. From the perspective of a single topic string, the broker is operating in a watch state which continues until a published message is received identified by the topic string is received (operation 302).

Assume, for purposes of description, the published message originates at the publish control component 204 of publisher 202, and includes a stock price in XML format, the associated topic string and an initial PubLevel=9 already assigned by the level control system 208 in publisher 202.

The matching engine in the broker system is employed in an operation 304 to identify any subscribers (that is, subscriber candidates) who have registered subscriptions to receive published messages identified by the topic string. If at least one subscriber candidate is found, a determination (operation 306) is made whether there is more than 1 subscriber candidate. If only one candidate subscriber is found, the message is forwarded to that subscriber without further processing and the broker returns to a watch state in which it waits for other messages identified by the same topic string.

In the example being discussed, the matching engine will initially identify three subscriber candidates (interceptor system 216, interceptor system 226 and subscriber system 240). Where there is more than one subscriber candidate, the broker must (in an operation 310) determine which of the candidates should be selected to actually receive the message. Operation 310, which is to be described in greater detail with reference to FIG. 4, is a subscriber selection operation that makes use both of the current PubLevel value of the received message and the assigned SubLevel values for all of the subscriber candidates.

Once a single subscriber candidate is identified in operation 310, the broker sets (operation 312) the message PubLevel value to a new value equal to the SubLevel value of the single subscriber candidate minus 1. As will be explained in more detail later, the change in the PubLevel value alters future processing of the published message within the pub/sub system. The message is then sent only to the selected subscriber in operation 314.

Figure 4:
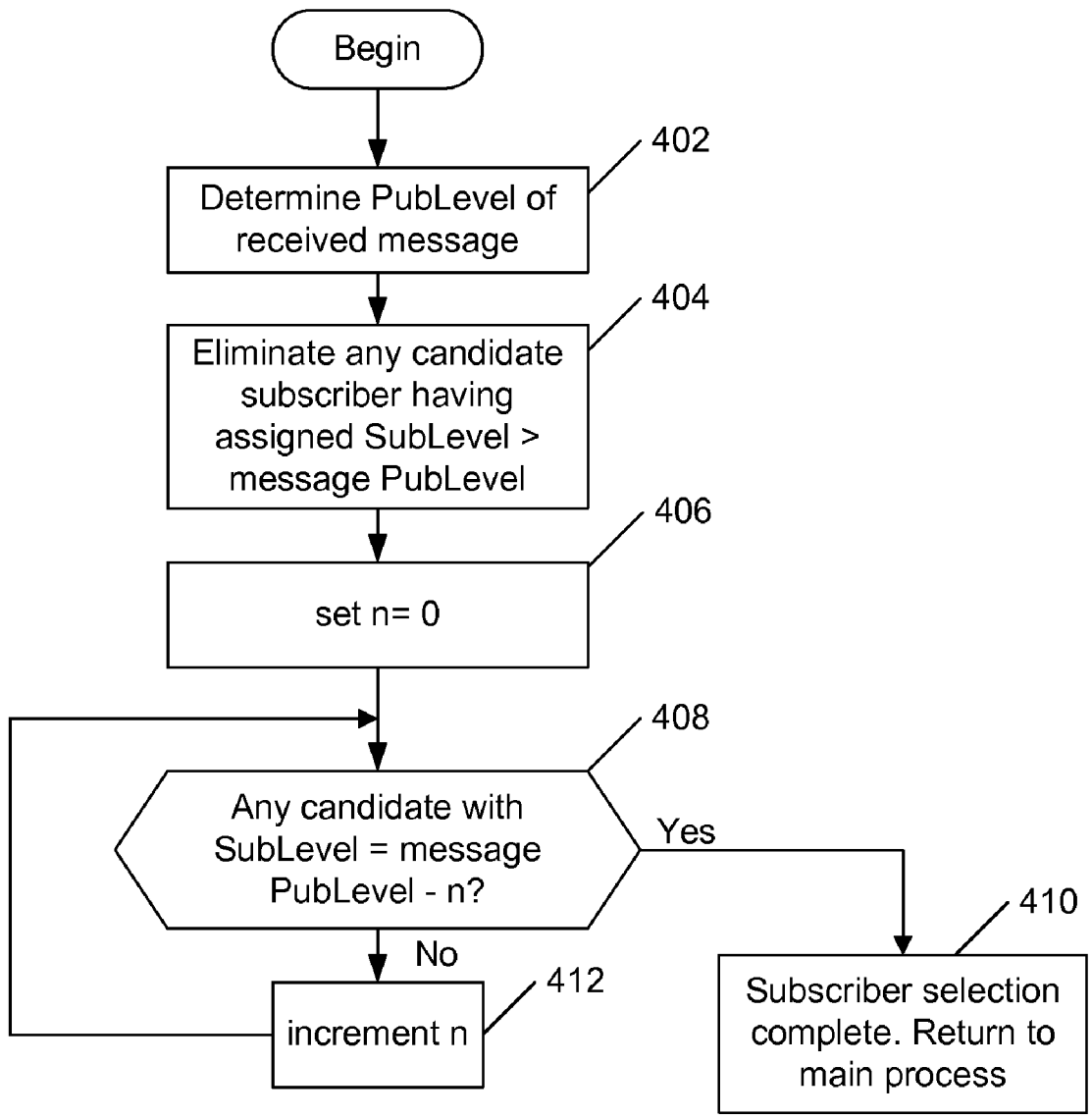
FIG. 4 is a more detailed flow chart of a subscriber selection operation shown only generally in FIG. 3.

Referring now to FIG. 4 for more details about the subscribe selection operation 310, the current PubLevel value of the received message is detected in an operation 402 and is compared to the assigned SubLevel value for each of the subscriber candidates. For reasons which are explained later, any subscriber candidate having an assigned SubLevel value greater than the current PubLevel value of the received message is eliminated from the candidate list in operation 404.

In the initial invocation of the subscriber selection operation, a value n is initialized to "0" in an operation 406 and an operation 408 is performed to determine whether any of the subscriber candidates have an assigned SubLevel value equal to the current PubLevel value of the message–n. If such a subscriber is found in operation 408, the subscriber selection operation is considered completed and program control returns to the main program in an operation 410. Since one of the rules of assigning SubLevel values is that different subscriber candidates should be assigned different SubLevel values, there should never be a situation where two or more subscriber candidates are identified at the same time in operation 408.

If, on the other hand, operation 408 reveals no subscriber candidates having a SubLevel value that matches the current PubLevel value of the message (which is the test where n="0"), the parameter n is incremented in operation 412. Operation 408 is then repeated to determine whether any of the subscriber candidates have an assigned SubLevel value equal to the message PubLevel–1. If no such subscriber candidate is identified, n is again incremented and operation 408 is repeated.

The subscriber selection operation is thus performed one or more times with n being incremented at the end of each round in a search for the candidate subscriber whose SubLevel value is closest in value to the message PubLevel value. Once that subscriber is identified, program control returns to the input of operation 312 (FIG. 3). As already noted, the broker alters the message PubLevel value in operation 312 based on the SubLevel value of the selected subscriber and then sends the message (with the newly assigned PubLevel value) to the selected subscriber in operation 314.

In the example being described, the broker would find a match between the initial message PubLevel value (that is, "9") and the SubLevel value (also "9") previously assigned to interceptor system 216 on the first iteration of operation 408 and would send the message to interceptor system 216 before returning to a message watch state. The broker does not necessary know or have reason to care what interceptor system 216 intends to do with the message it receives.

Figure 5:
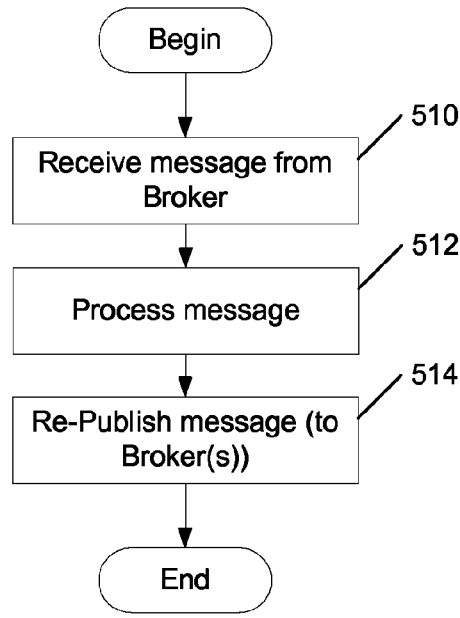
FIG. 5 is a flow chart of operations performed in a selected interceptor system in a publish/subscribe system implementing the present invention.

FIG. 5 is a simplified flow chart of message processing operations performed in an interceptor system to which a published message is sent. Once the message is received in operation 510, the message is transformed or otherwise processed in an operation 512 according with operations previously designed or programmed into the interceptor system. As already noted, one example of a suitable operation would be conversion of the message content from XML format to HTML format. Clearly, the invention is obviously not limited to any particular transformation or conversion operations.

Once operation 512 is completed, the interceptor system republishes (operation 514) the message into the pub/sub system or specifically to the broker that originally provided the message. While the interceptor system may change the message content, it does not change either the token string associated with the message or the message PubLevel value.

The broker will receive and process the message published by the interceptor system 216, repeating the same operations (302-314 and 402-416) it used in processing the message as originally provided by the original publisher. The end result of the operations will, however, be different each time the broker operations are performed because the changes in message PubLevel value of the message that are made in operation 312 just before the end of each iteration of broker operations. As previously noted, broker operation 312 assigns a new message PubLevel value equal to one less than the SubLevel value of the subscriber who is to receive the message before actually transmitting the message to the selected subscriber. Because the subscriber selected in the first iteration was interceptor system 216 with an assigned SubLevel value of 9, operation 312 causes the PubLevel value of the message to be reduced to 8.

On the first pass through the broker, the original message PubLevel value of "9" is set to "8".

On the second pass through the broker, the broker will again identify both interceptor systems 216 and 226 and subscriber system 240 as subscriber candidates. However, because the current PubLevel value is reduced to "8" before the second pass starts, interceptor system 216 will immediate be removed from the candidate list. The second pass broker operations will eventually result in selection of interceptor system 226 (with its assigned SubLevel value of 5) to receive the message. Near the end of the second pass of operations in the broker, the message PubLevel value will again be reduced, this time to a PubLevel of "4" (the SubLevel of interceptor system 216 minus 1).

The second pass through the broker will result in the PubLevel of the once-altered message being reduced to a value of 4 (operation 312) just before the message is transmitted to the second interceptor system 226.

Once the second interceptor system 226 has processed the message, it is republished to the broker for a third time. On the third pass, both interceptor systems 216 and 226 will be ineligible to be subscriber candidates since both will have SubLevel values greater than the current message PubLevel value of 4. Only subscriber system 240 with its SubLevel value of 1 will remain as a candidate. The message will be sent directly to subscriber system 240 as a result of operation 306.

Figure 6:
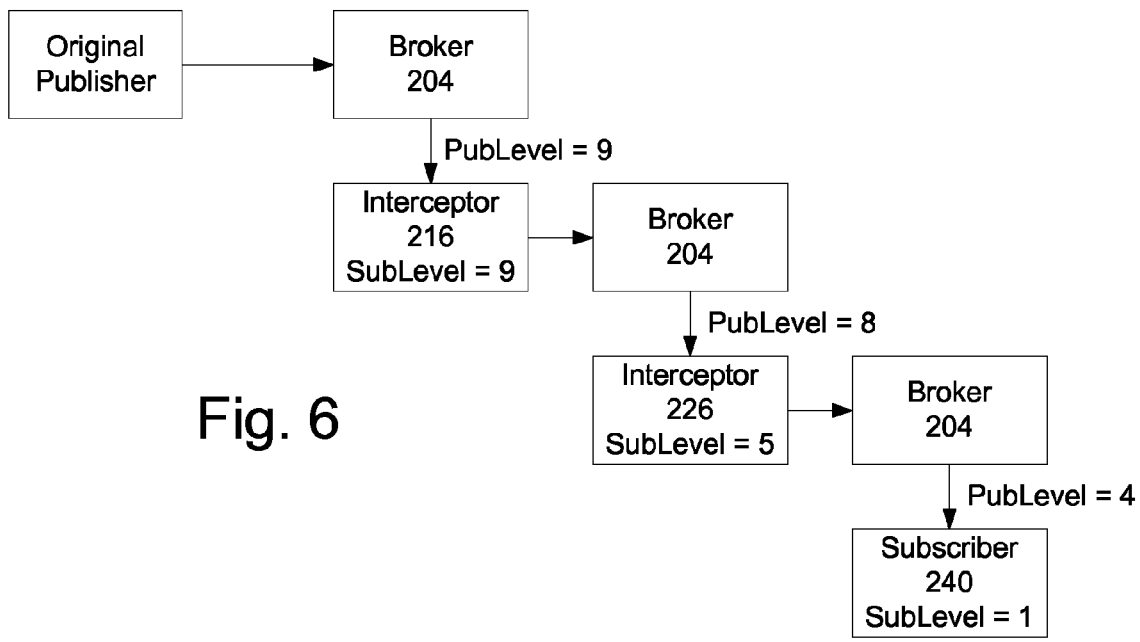
FIG. 6 is a diagrammatic representation of one example of a document path during processing in a publish/subscribe system implementing the present invention.

FIG. 6 is a diagrammatic summary of the path of a message through the above described system. The diagram clearly shows the message PubLevel value being reduced each time the message is processed by an interceptor system and then re-published.

While the use of only two interceptor systems has been described, clearly a greater number of interceptor systems could be deployed and the order in which those interceptor systems received and processed a published message could be altered by manipulating the SubLevel values assigned to the different interceptor systems.

In publish/subscribe systems, some messages are marked as "retain" publications, meaning the broker should retain them even after distribution to known subscribers. In a system implementing the present invention, this practice could be modified by retaining the message only if the first publication message is not intercepted at a SubLevel value of "2" or higher. Thus, if a message is intercepted and processed at a SubLevel value of "2" or higher, the first publication message is not retained as there is less likely to be a need for retaining the original first publication message if the first publication message has been processed (e.g. transformed). Preferably, the "retain" property is also carried with the second publication message.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. For use in a publish/subscriber system in which a published message originating with a publisher is identified by an associated topic string and originally includes a PubLevel value assigned by the publisher, a broker apparatus comprising:
    a receiver component for receiving the published message;
    a subscriber selection component for selecting a subscriber from a set of one or more subscriber candidates that have registered a subscription with the broker to receive published messages identified by the associated topic string, each of said subscriber candidates having an associated SubLevel value;
    a publication control component for changing the PubLevel value associated with the published message as a function of the SubLevel value associated with the subscriber selected by the subscriber selection component; and
    a transmit component for forwarding the published message to the subscriber selected by the subscriber selection component.

2. A broker apparatus according to claim 1 wherein the subscriber selection component eliminates from consideration any subscriber candidate having an associated SubLevel value greater than the current PubLevel value of the published message.

3. A broker apparatus according to claim 2 wherein the publication control component changes the PubLevel value associated with the published message to a value less than the SubLevel value of the selected subscriber.

4. A broker apparatus according to claim 3 wherein the subscriber selection component selects a subscriber having an associated SubLevel value less than and closer to the published message PubLevel value than the associated SubLevel value of any of the other subscriber candidates.

5. For performance in a broker apparatus in a publish/subscribe system in which a published message originating with a publisher is identified by an associated topic string and originally includes an associated PubLevel value assigned by the publisher, a method of processing a published message comprising:

receiving the published message;

identifying both a topic string associated with the published message and the value of the PubLevel value currently assigned to the published message;

selecting a subscriber to receive the published message from a set of one or more subscriber candidates that have registered subscriptions with the broker apparatus to receive published messages identified by the topic string associated with the published message, each of said subscriber candidates having an associated SubLevel value;

changing the PubLevel value assigned to the published message as a function of the SubLevel value associated with the subscriber selected to receive the published message; and sending the published message to the subscriber selected to receive the published message.

6. A method according to claim 5 wherein selecting a subscriber to receive the published message from a set of one or more subscriber candidates that have registered subscriptions with the broker apparatus to receive published messages identified by the topic string further comprises eliminating from consideration any subscriber candidate having an associated SubLevel value greater than the current PubLevel value of the published message.

7. A method according to claim 6 further comprising changing the PubLevel value assigned to the published message to a value less than the SubLevel value of the subscriber selected to receive the published message before the message is sent to said subscriber.

8. A method according to claim 7 wherein selecting a subscriber to receive the message from a set of one or more subscriber candidates that have registered subscriptions with the broker to receive published messages identified by the topic string further comprises selecting a subscriber having an associated SubLevel value less than and closer to the published message PubLevel value than the SubLevel value of any of the other subscriber candidates.

9. A computer program product for controlling the processing of messages at a broker apparatus in a publish/subscribe system in which a published message originating with a publisher is identified by an associated topic string and originally includes an PubLevel value originally assigned by the publisher, said computer program product comprising a non-transitory computer usable medium having computer usable program code embodied therein, said computer usable program code comprising:

computer usable program code configured to receive the published message;

computer usable program code configured to identify both a topic string associated with the published message and the value of the PubLevel value currently assigned to the published message;

computer usable program code configured to select a subscriber to receive the published message from a set of one or more subscriber candidates that have registered subscriptions with the broker apparatus to receive published messages identified by the topic string associated with the published message, each of said subscriber candidates having an associated SubLevel value;

computer usable program code configured to change the PubLevel value assigned to the published message as a function of the SubLevel value associated with the subscriber selected to receive the published message; and computer usable program code configured to send the published message to the subscriber selected to receive the published message.

10. A computer program product according to claim 9 wherein the computer usable program code configured to select a subscriber to receive the published message from a set of one or more subscriber candidates that have registered subscriptions with the broker to receive published messages identified by the topic string further comprises computer usable program code configured to eliminate from consideration any subscriber candidate having an associated SubLevel value greater than the current PubLevel value of the published message.

11. A computer program product according to claim 10 further comprising computer usable program code configured to change the PubLevel value associated with the published message to a value less than the SubLevel value of the subscriber selected to receive the published message before the message is sent to said subscriber.

12. A computer program product according to claim 11 wherein said computer usable program code configured to select a subscriber to receive the published message from a set of one or more subscriber candidates that have registered subscriptions with the broker apparatus to receive published messages identified by the topic string associated with the published message, each of said subscriber candidates having an associated SubLevel value, further comprises computer usable program code selected to select subscriber having an associated SubLevel value less than and close to the published message PubLevel value than the SubLevel value of any of the other subscriber candidates.

* * * * *